0
United States Patent Office 3,168,520
Patented Feb. 2, 1965

3,168,520
2-IMINO-1,3-DISUBSTITUTED HEXAHYDRO-PYRIMIDINES AND IMIDAZOLIDINES
Alois Kleemann, Basel, and Jakob Bindler, Riehen, near Basel, Switzerland, assignors, by mesne assignments, to Geigy Chemical Corporation, Ardsley, N.Y., a corporation of Delaware
No Drawing. Filed July 27, 1962, Ser. No. 213,045
Claims priority, application Switzerland, Aug. 5, 1960, 8,950/60; Sept. 9, 1960, 10,206/60; July 12, 1961, 8,182/61
9 Claims. (Cl. 260—256.4)

The present application is a continuation-in-part of application Serial No. 129,220, filed August 4, 1961, and now abandoned.

The present invention concerns 2-amino-1,3-di-N-heterocyclic compounds substituted at the iminonitrogen atom, processes for the production thereof, their use for the making of dyeings and of synthetic substances fast to gas-fading, as well as, as industrial product, the materials made fast in this way to gas-fading.

It is known that cellulose esters and ethers dyed with certain dyestuffs undergo an undesirable change in shade in an atmosphere containing industrial fumes.

It has now been found that the alteration of such dyeings and the damage to elastomeric polyurethanes, in particular the yellowing thereof, due to gas-fading can be lessened by treating such materials with substituted 2-imino-1,3-di-N-heterocyclic compounds of the general Formula I

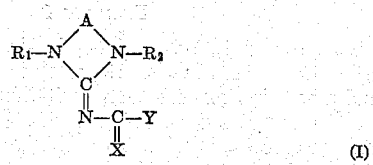

(I)

wherein A is a member selected from the group consisting of

—CH$_2$—CH$_2$—, —CH$_2$—CH$_2$—CH$_2$—, —CH$_2$—CH—
$\phantom{CCCCCCCCCCCCCCCCCCCCCCCCCCCCCCCCC}$ $|$
$\phantom{CCCCCCCCCCCCCCCCCCCCCCCCCCCCCCCCC}$ CH$_3$ and

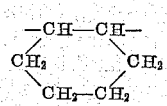

X is a member selected from the group consisting of O and S,
Y is a member selected from the group consisting of

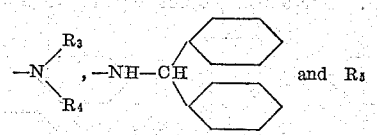

and each of R$_1$, R$_2$, R$_3$ and R$_4$ taken independently of each other is a member selected from the group consisting of hydrogen,
alkyl with maximally 12 carbon atoms,
cyclohexyl, lower alkyl-cyclohexyl, lower alkoxy-cyclohexyl, and

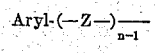

wherein Z is an alkylene radical with from 1 to 2 carbon atoms, n is an integer ranging from 1 to 2, and
Aryl is a member selected from the group consisting of unsubstituted, chlorine-substituted, alkyl-substituted and alkoxy-substituted phenyl and naphthyl, the last mentioned alkyl and alkoxy having maximally 12 carbon atoms, R$_3$ and R$_4$ taken together is —(CH$_2$)$_m$— wherein m is an integer ranging from 4 to 5, and
R$_5$ being a member other than hydrogen, selected from the above group defining R$_1$, R$_2$, R$_3$ and R$_4$ Particularly good results are obtained with the compounds of the Formula I in which A, R$_1$, R$_2$ and X have the above defined meaning and wherein Y is a member selected from the group consisting of —NH$_2$, —NH-alkyl with up to and including 12 carbon atoms, —N(lower alkyl)$_2$, piperidyl, —NH-cyclohexyl, —NH-benzyl, —NH-lower alkyl-benzyl, —NH-lower alkoxybenzyl, —NH-chlorobenzyl, —NH-phenyl, —NH-lower alkylphenyl, —NH-naphthyl, —NH-phenylethyl, —NH-diphenylmethyl, —NH-naphthylmethyl, alkyl with up to and including 12 carbon atoms, cyclohexyl, benzyl, phenyl and naphthyl.

Compounds of the Formula I
wherein A is —CH$_2$—CH$_2$— or CH$_2$—CH$_2$—CH$_2$—,
R$_1$ is benzyl,
R$_2$ is hydrogen or benzyl
Y is phenyl, —NH-phenyl, —NH-benzyl, —N(C$_2$H$_5$)$_2$ or piperidyl and
X is O or S
are especially preferred.

Substituted 2-amino-1,3-di-N-heterocyclic compounds of Formula I according to the invention are obtained by reacting a compound of the Formula II

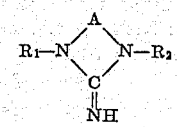

with an agent introducing the radical

in which formula, A, R$_1$, R$_2$, X and Y have the meanings given under Formula I.

Examples of compounds of Formula II are:

2-imino-imidazolidine and -hexahydropyrimidine,
2-imino-1-decyl-imidazolidine and -hexahydropyrimidine,
2-imino-1-dodecyl-imidazolidine and -hexahydropyrimidine,
2-imino-1-tetradecyl-imidazolidine and -hexahydropyrimidine,
2-imino-1-hexadecyl-imidazolidine and -hexahydropyrimidine,
2-imino-1-octadecyl-imidazolidine and -hexahydropyrimidine,
2-imino-1,3-di-dodecyl-imidazolidine and -hexahydropyrimidine,
2-imino-1-phenyl-imidazolidine and -hexahydropyrimidine,
2-imino-1,3-diphenyl-imidazolidine and -hexahydropyrimidine,
2-imino-1-o-chlorophenyl-imidazolidine and -hexahydropyrimidine,
2-imino-1-benzyl-imidazolidine and -hexahydropyrimidine,
2-imino-1,3-dibenzyl-imidazolidine and -hexahydropyrimidine,
2-imino-1-dodecylbenzyl-imidazolidine and -hexahydropyrimidine,
2-imino-1-cyclohexyl-imidazolidine and -hexahydropyrimidine,
2-imino-1,3-dicyclohexyl-imidazolidine and -hexahydropyrimidine,
2-imino-1-benzyl-4,5-tetramethylene-imidazolidine,
2-imino-1-benzyl-4-methyl-imidazolidine.

As the group

is preferably a carbamyl or thiocarbamyl radical, the agents used to introduce these are preferably isocyanates or, also urethanes, or preferably mustard oils or, also, thiourethanes respectively, and if Y is the NH₂ group, alkali cyanate or a carbamic acid halide is used in the former case or alkali rhodanides in the latter case. The isocyanates or mustard oils are preferred and of these, chiefly those of the aromatic and araliphatic series such as, e.g. phenyl isocyanate or phenyl mustard oil or benzyl isocyanate or benzyl mustard oil.

The group

however, can also be a carbacyl or thiocarbacyl radical. Esters are chiefly used to introduce this group, in particular esters of low alkanols such as, e.g. methyl or ethyl esters of carboxylic acids, principally of aromatic and araliphatic carboxylic acids, e.g. of benzoic acid or thiobenzoic acid or of phenylacetic acid or phenylthioacetic acid. Instead of carboxylic acid esters, in some cases also carboxylic acid halides and, possibly, also ketenes can be used such as, e.g. phenyl ketene can be used as agent introducing a carbacyl radical.

The agents introducing the radical

are reacted with the compounds of Formula II advantageously in an inert organic solvent, in particular in an aromatic hydrocarbon such as, e.g. benzene, toluene or xylene, if necessary while heating.

In some cases it is also possible to perform the reaction in aqueous dispersion or by melting the reaction components together.

Compounds of Formula II used according to the invention are known or can be produced by known methods by reacting cyanogen chloride with a diamine of the general Formula III $$R_1—NH—A—NH—R_2 \quad\quad III$$

wherein $R_1$, $R_2$ and A have the meanings given in Formula I.

To improve the fastness to gas-fading of dyeings on cellulose esters or ethers, the 2-imino-1,3-di-N-heterocyclic compounds substituted according to the invention at the iminonitropen atom by the

group are used either before, during or after the dyeing, for example by pre-treating the cellulose ester or ether fibres or fabrics with a solution or dispersion of the compounds according to the invention, or by adding these compounds to the dyebath so that the dyeing and protection against gas-fading can be performed simultaneously, or by after-treating the dyed cellulose ester or ether materials with these compounds.

Also, for the protection of elastomeric polyurethanes, preferably in the form of fibres such as, e.g. Spandex fibres (long chain synthetic polymers containing at least 85% of a segmented polyurethane), from damage by industrial fumes, in particular for lessening the yellowing thereof, such polyurethanes are treated with a solution or dispersion of the 2-imino-1,3-di-N-heterocyclic compounds according to the invention.

The 2-imino-1,3-di-N-heterocyclic compounds substituted at the imino nitrogen atom by the

group can also be incorporated into spinning masses.

Dyed cellulose esters or ethers and the elastomeric polyurethanes treated with the compounds according to the invention are remarkably resistant to the effect of industrial fumes, namely nitrogen oxides.

The following examples illustrate the invention. Where not otherwise stated, parts are given as parts by weight. The relationship of parts by weight to parts by volume is as that of kilogrammes to litres.

Example 1

30 parts of 1-benzyl-2-imino-imidazolidine are dissolved in 200 parts of anhydrous benzene and 20 parts of phenyl isocyanate are added dropwise at room temperature while stirring. The temperature spontaneously rises from about 20° to 40–50°. After the dropwise addition, the whole is stirred for an hour at 60–70°. The benzene is then distilled off in vacuo. The residue is recrystallised from alcohol. In this way, the 1-benzyl-2-phenyl-carbamyl-imino-imidazolidine is obtained as beautiful, white crystals which melt at 118–120°. The product correponds to the formula

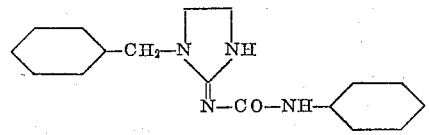

or to the tautomeric 2-phenylureido-imidazoline form.

If, in the above process, a corresponding number of parts of p-chloro- or p-ethoxy-phenyl isocyanate or of naphthyl-(1)-isocyanate or 8-methyl- or 6-chloro- or 4-methoxy-naphthyl-(1)-isocyanate are used, then a compound having similar properties is obtained.

Example 2

90 parts of 1,3-dibenzyl-2-imino-imidazolidone hydrochloride are dissolved in 350 parts of anhydrous methanol and a solution of 16.2 parts of sodium methylate in 100 parts of anhydrous methanol is added while stirring. The sodium chloride precipitates and is removed by filtration. The solvent is then distilled off in vacuo. The residue is then dissolved in 350 parts of anhydrous benzene and a solution of 42 parts of benzyl isocyanate in 40 parts of benzene is added dropwise while stirring at room temperature whereupon the temperature of the mixture rises. The whole is stirred for 30 minutes at 70–80°. The clear solution obtained is reduced to a third of its volume by distilling off the solvent whereupon it is cooled and the reaction product is precipitated by the addition of petroleum ether. At first an oil separates which slowly solidifies. On recrystallising from a mixture of ethyl acetate and n-hexane, 1,3-dibenzyl-2-benzylcarbamylimino-imidazolidine is obtained in the form of white needles which melt at 96°. The substance corresponds to the formula

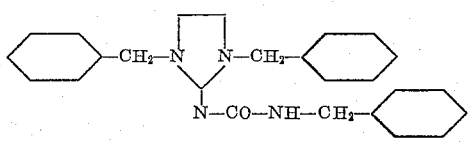

Example 3

4.6 parts of sodium are dissolved in 100 parts of anhydrous methanol. The solution is then poured quickly into a solution of 45 parts of 1-benzyl-2-imino-hexahydropyrimidine hydrochloride in 300 parts of anhydrous methanol. The sodium chloride precipitates and is filtered off, and the solvent is distilled off in vacuo. The residue is dissolved in 300 parts of anhydrous benzene at 60° and a solution of 27 parts of benzene isocyanate in 30 parts of anhydrous benzene is added dropwise. The reaction is slightly exothermic. The whole is then refluxed for 2 hours. The cooled reaction mixture is diluted with the same volume of petroleum ether whereupon a precipitate is soon formed. This is filtered off under suction and recrystallised from a mixture of benzene and n-hexane. The 1-benzyl-2-benzylcarbamylimino-hexahydropyrimidine is obtained as white crystals which melt at 112°. The compound corresponds to the formula

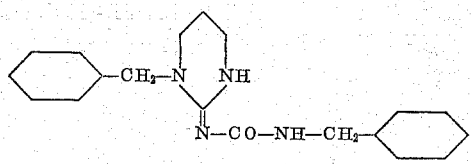

or to the tautomeric 2-benzylureido-tetrahydropyrimidine form.

*Example 4*

4.6 parts of sodium are dissolved in 100 parts of anhydrous methanol and this solution is mixed with the solution of 45 parts of 1-benzyl-2-imino-hexahydropyrimidine hydrochloride in 300 parts of anhydrous methanol, whereupon the sodium chloride precipitates. It is filtered off and the solvent in the filtrate is distilled off in vacuo. The residue is dissolved at 60° in 300 parts of anhydrous benzene. A solution of 30 parts of benzyl mustard oil in 30 parts of benzene is added dropwise to this solution at room temperature and the whole is refluxed for 2 hours. On cooling, the reaction product partly crystallises out. It is filtered off and petroleum ether is added to the clear filtrate whereupon more of the end product crystallises out. It is filtered off under suction and recrystallised from benzene. 1-benzyl-2-benzylthiocarbamylimino-hexahydropyrimidine which melts at 126° is obtained in this way.

The substance corresponds to the formula

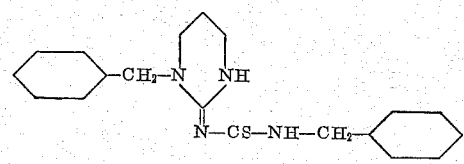

or to the tautomeric 2-benzylthioureido-tetrahydropyrimidine form.

*Example 5*

4.6 parts of sodium are dissolved in 100 parts of anhydrous methanol, a solution of 45 parts of 1-benzyl-2-imino-hexahydropyrimidine hydrochloride in 300 parts of anhydrous methanol is quickly added whereupon sodium chloride precipitates and is filtered off. 28 parts of benzoic acid methyl ester are added to the clear filtrate and the methanol is removed by distillation through a sloping condenser. The distillation residue is then slowly heated in an oil bath to an inner temperature of 130–135° and it is kept at this temperature until nothing more passes through the sloping condenser. The apparatus is then evacuated to a pressure of 12 mm. Hg whereupon an additional amount of methanol is distilled off and the whole is kept under the same pressure for 15 minutes at 130°. After cooling, the solid reaction product is recrystallised from a mixture of benzene and n-hexane. 1-benzyl-2-benzoylimino-hexa-hydropyrimidine is obtained in this manner as white crystals which melt at 122°. The product corresponds to the formula

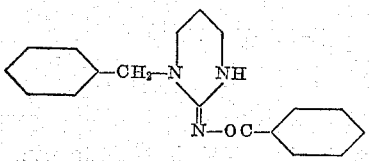

or to the tautomeric 2-benzoylamino-tetrahydropyrimidine form.

If, in the above example, a corresponding number of parts of p-methyl-, p-chloro- or p-methoxy- benzoic acid methyl ester or of α-naptholic acid methyl ester or 2-chloro- or 2-methyl- or 2-methoxy- naphtholic -(1)-acid methyl ester are used, then a compound having similar properties is obtained.

*Example 6*

64.6 parts of sodium are dissolved in 100 parts of ethanol. This solution is mixed with a solution of 58 parts of 1-dodecyl-2-imino-imidazolidine hydrochloride in 300 parts of ethanol. Sodium chloride immediately precipitates and is filtered off. The solvent in the filtrate is removed by distillation in vacuo at 50°. The residue is dissolved in 150 parts of anhydrous benzene. A solution of 27 parts of phenyl mustard oil in 30 parts of benzene is added dropwise to this solution at room temperature while stirring and then the whole is refluxed for 2 hours. On cooling, the reaction product crystallises out. It is filtered off under suction and, to purify, is recrystallised from benzene. 1-dodecyl-2-phenylthiocarbamylimino-imidazolidine is obtained in this way as white crystals which melt at 118–120°. The compound corresponds to the formula

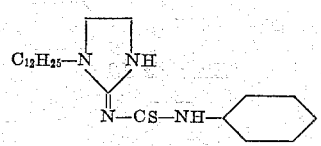

or to the tautomeric 2-phenylthioureido-imidazolidine form.

*Example 7*

24 parts of 1,3-diphenyl-2-imino-imidazolidine are dissolved in 300 parts of anhydrous benzene at 60°. 13 parts of benzyl isocyanate in 20 parts of anhydrous benzene are added dropwise to this solution while stirring at 50°. Towards the end of the dropwise addition, a precipitate forms. The reaction mixture is refluxed for 30 minutes. On cooling, crystals separate out. These are filtered off under suction and recrystallised. In this way, 1,3-diphenyl-2-benzylcarbamylimino-imidazolidine is obtained in the form of white crystals which melt at 162–164°. The compound corresponds to the formula

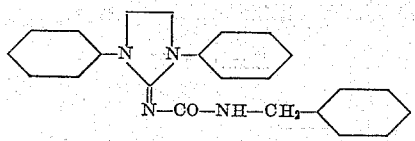

*Example 8*

49 parts of 2-imino-imidazolidine hydrochloride are dissolved in 250 parts of anhydrous methanol and a solution of 9.2 parts of sodium in 150 parts of anhydrous methanol is added while stirring. The sodium chloride precipitates and is filtered off. A solution of 66 parts of phenyl urethane in 100 parts of anhydrous alcohol is added to the filtrate. The alcohol is then completely distilled off through a sloping condenser and the residue is heated to 140–145°. When nothing more passes through the sloping condenser, the apparatus is evacuated to a pressure of 12 mm. Hg whereupon an additional amount of alcohol is distilled off. The residue is kept for another 10 minutes at 140° in vacuo. On cooling, the mass solidifies. 2-phenylcarbamylimino-imidazolidine is obtained on recrystallising from methanol in the form of white crystals which melt at 175–178°. The product corresponds to the formula

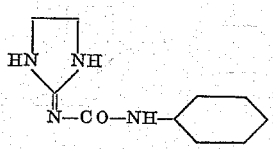

*Example 9*

61 parts of 2-imino-imidazolidine hydrochloride are dissolved in 100 parts of methanol and a solution of 27 parts of sodium methylate in 200 parts of anhydrous methanol is added whereupon the sodium chloride precipitates and is filtered off. The solvent is then distilled off under vacuum and the residue is dissolved in 100 parts of acetone and 20 parts of water. A solution of 67 parts of benzyl isocyanate in 50 parts of acetone is then added dropwise whereupon an exothermic reaction takes place. The reaction temperature is kept at 40° by cooling with cold water. On completion of the dropwise addition, the whole is stirred for half an hour at 60°. On cooling, white crystals separate out. They are filtered off and the filtrate is concentrated at 40° in vacuo. On cooling, a further amount of crystals is obtained. On recrystallising these crystals from acetone, 2-benzylcarbamylimino-imidazolidine is obtained as white crystals which melt at 183°. The product corresponds to the formula

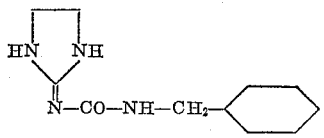

*Example 10*

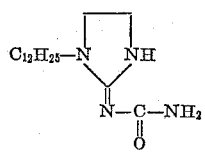

4.6 parts of sodium are dissolved in 150 parts of ethanol and the solution of 58 parts of 1-dodecyl-2-imino-imidazolidine hydrochloride in ethanol is added. Sodium chloride separates out and is removed by filtration. 20 parts of carbamic acid ethyl ester are added to the filtrate and the alcohol is completely distilled off through a sloping condenser. The residue is heated to 120–130°. When no more alcohol distills over, the apparatus is evacuated for a short time in order to remove any traces of alcohol remaining. On cooling, the mass solidifies, and it is recrystallised from benzene. In this way, 1-dodecyl-2-carbamylimino-imidazolidine which melts at 113° is obtained.

*Example 11*

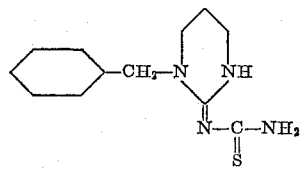

23 parts of 1-benzyl-2-imino-hexahydropyrimidine hydrochloride are mixed with 10 parts of potassium rhodanide and they are melted together at 160°. The mass is stirred for 10 minutes at 160° and then cooled whereupon it solidifies. The mass is recrystallised from ethyl acetate. In this way, 1-benzyl-2-thiocarbamylimino-hexahydropyrimidine which melts at 99–100° is obtained.

Similar substances are obtained if, instead of 1-benzyl-2-imino-hexahydropyrimidine hydrochloride, 1-benzyl-2-imino-imidazolidine hydrochloride is used in the manner described and otherwise the same procedure is followed.

*Example 12*

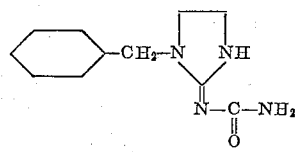

35 parts of 1-benzyl-2-imino-imidazolidine are dissolved in 150 parts of ethanol and 20 parts of carbamic acid ethyl ester are added. The mixture is then boiled and the alcohol is distilled off through a sloping condenser. The remaining reaction mass is heated to 100–120°. When no more alcohol distills over, the apparatus is evacuated for 5 minutes. The reaction mass is then cooled whereupon it solidifies. On recrystallising from water, 1-benzyl-2-carbamylimino-imidazolidine is obtained as white crystals which melt at 167–168°.

Similar products are obtained if, instead of 1-benzyl-2-imino-imidazolidine, 1-benzyl-2-imino-hexahydropyrimidine is reacted with carbamic acid ethyl ester in the manner described above.

*Example 13*

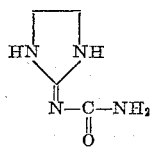

A solution of 9.2 parts of sodium in 300 parts of ethanol is combined with a solution of 49 parts of 2-imino-imidazolidine hydrochloride in ethanol whereupon sodium chloride separates out. This salt is filtered off, 40 parts of carbamic acid ethyl ester are added to the filtrate and the alcohol is completely distilled off through a sloping condenser. The residue is heated to 130° and then recrystallised from water whereupon 2-carbamylimino-imidazolidine is obtained in the form of white crystals which melt at 175–176° (on decomposition).

*Example 14*

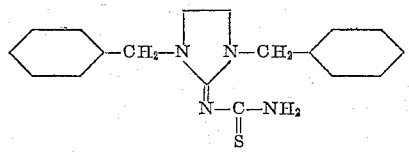

30 parts of 1,3-dibenzyl-2-imino-imidazolidine hydrochloride and 10 parts of potassium rhodanide are melted together at 160° and the whole is stirred for 10 minutes at this temperature. The reaction mixture is then cooled and recrystallised from ethyl acetate. 1,3-di-benzyl-2-thiocarbamylimino-imidazolidine which melts at 114° is obtained in this way.

*Example 15*

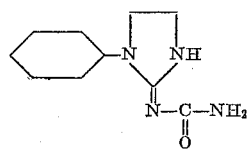

40 parts of 1-phenyl-2-imino-imidazolidine hydrochloride and 16 parts of potassium cyanate are melted together at 175° and the whole is stirred for 10 minutes at this temperature. The reaction mixture is then cooled and recrystallised from water. In this way, 1-phenyl-2-carbamylimino-imidazolidine which melts at 186° (on decomposition) is obtained.

*Example 16*

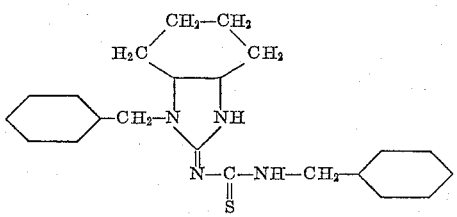

46 parts of 1-benzyl-2-imino-4,5-tetramethylene-imidazolidine are dissolved in 150 parts of anhydrous benzene and 30 parts of benzyl mustard oil are added dropwise while stirring at 60°. The whole is then refluxed for 1 hour. 1-benzyl-2-benzylthiocarbamylimino-4,5-tetramethylene-imidazolidine is obtained by concentrating the solution.

If in the above example, instead of benzyl mustard oil, phenyl isocyanate is used then a compound having similar properties is obtained.

Example 17

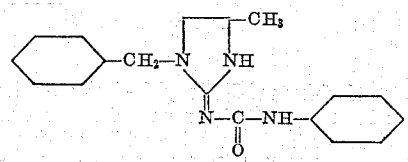

4.6 parts of sodium are dissolved in 100 parts of ethanol and this solution is poured into a solution of 45 parts of 1-benzyl-2-imino-4-methyl-imidazolidine hydrochloride in ethanol. Sodium chloride in the form of insoluble salt is precipitated and is removed by filtration. The filtrate is evaporated to dryness in vacuo. The residue is boiled in anhydrous benzene and 24 parts of phenyl isocyanate are added dropwise while stirring at 60°. The whole is refluxed for 1 hour. On evaporating off the solvent, 1-benzyl-2-phenylcarbamylimino-4-methyl-imidazolidine is obtained.

Example 18

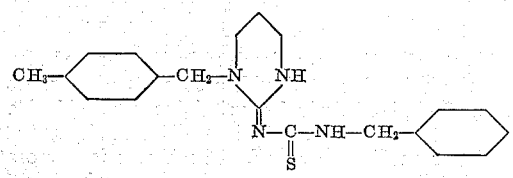

4.6 parts of sodium are dissolved in 100 parts of ethanol. At the same time, 48 parts of 1-p-methylbenzyl-2-imino-hexahydropyrimidine hydrochloride are dissolved in 150 parts of methanol and the two solutions are mixed. The sodium chloride which separates out is filtered off and the solution is evaporated to dryness in vacuo. The residue is dissolved in 300 parts of anhydrous benzene and 30 parts of benzyl mustard oil are added dropwise while stirring. Then the whole is boiled for 1 hour. On concentrating the solution, 1 - p - methylbenzyl - 2-benzylthiocarbamylimino-hexahydropyrimidine is obtained.

Example 19

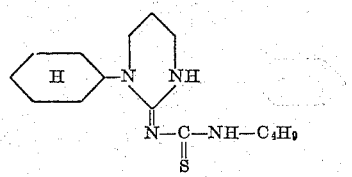

4.6 parts of sodium are dissolved in 100 parts of ethanol and the solution is mixed with the solution of 44 parts of 1-cyclohexyl-2-imino-hexahydropyrimidine hydrochloride in ethanol. Sodium chloride immediately precipitates and is filtered off. The filtrate is evaporated to dryness in vacuo. The residue is dissolved in benzene and 23 parts of butyl mustard oil are added dropwise, after which the whole is boiled for 1 hour. After distilling off the solvent, 1-cyclohexyl-2-butylthiocarbamyl-imino-hexahydropyrimidine is obtained.

If, instead of 1-cyclohexyl-2-imino-hexahydropyrimidine hydrochloride, 1-cyclohexyl-2-imino-imidazolidine hydrochloride is used, then a similar compound is obtained.

Example 20

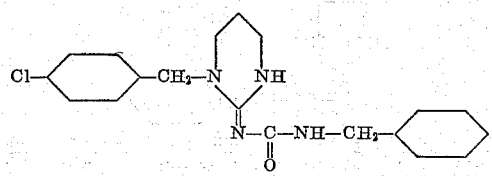

The solution of 4.6 parts of sodium in 100 parts of ethanol is mixed with a solution of 52 parts of 1-p-chlorobenzyl - 2 - imino - hexahydropyrimidine hydrochloride in 150 parts of methanol. Sodium chloride precipitates and is filtered off. The filtrate is completely evaporated to dryness in vacuo and the residue is dissolved in 300 parts of anhydrous benzene. 27 parts of benzyl isocyanate are then added dropwise at 60° while stirring whereupon the whole is boiled for 1 hour. On concentrating the solution, 1 - p - chlorobenzyl - 2 - benzylcarbamylimino-hexahydropyramidine is obtained.

Example 21

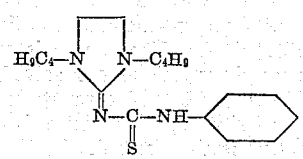

The solution of 4.6 parts of sodium in 100 parts of ethanol is mixed with a solution of 47 parts of 1,3-dibutyl-2-imino-imidazolidine hydrochloride in 150 parts of ethanol whereupon sodium chloride precipitates. This is filtered off and the filtrate is evaporated to dryness in vacuo. The residue is taken up in anhydrous benzene and 27 parts of phenyl mustard oil are added while stirring at ambient temperature, whereupon the whole is boiled for 1 hour. On distilling off the solvent, 1,3-dibutyl-2-phenylthiocarbamylimino-imidazolidine is obtained.

Example 22

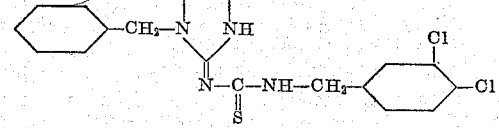

4.75 parts of sodium are dissolved in 100 parts of ethanol and this solution is mixed with a solution of 46 parts of 1-benzyl-2-imino-hexahydropyrimidine hydrochloride in 75 parts of methanol. Sodium chloride precipitates and is filtered off. The filtrate is evaporated to dryness in vacuo. The residue is dissolved in 300 parts of anhydrous benzene and 45 parts of 3,4-dichlorobenzyl mustard oil are added dropwise while stirring whereupon the whole is boiled for 1 hour. After cooling, it is diluted with petroleum ether whereupon the product crystallises out. It is filtered off under suction and recrystallised from benzene. In this way, 1-benzyl-2-m,p-dichlorobenzylthiocarbamylimino - hexahydropyrimidine which melts at 149–150° is obtained.

Example 23

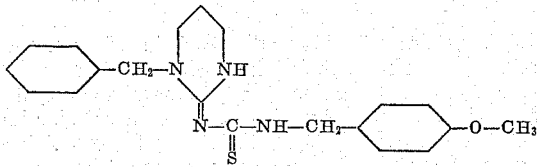

A solution of 4.6 parts of sodium in 100 parts of ethanol and a solution of 45 parts of 1-benzyl-2-iminohexahydropyrimidine hydrochloride in 75 parts of methanol are mixed. Sodium chloride precipitates and is removed by filtration. The filtrate is evaporated to dryness in vacuo and the residue is dissolved in 300 parts of benzene at 60°. 36 parts of p-methoxybenzyl mustard oil are then added at 60° while stirring. An exothermic reaction takes place on completion of which the whole is boiled for 1 hour. On cooling, the product crystallises out. It is filtered off under suction and recrystallised from benzene. In this way, 1-benzyl-2-p-methoxybenzylthiocarbamylimino-hexahydropyrimidine which melts at 127–129° is obtained.

Example 24

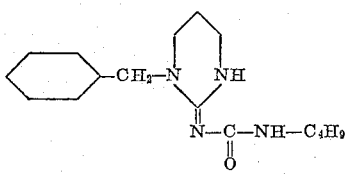

9.2 parts of sodium are dissolved in 150 parts of ethanol. A solution of 90 parts of 1-benzyl-2-imino-hexahydropyrimidine hydrochloride in 150 parts of methanol is added thereto. Sodium chloride immediately precipitated and is filtered off. The filtrate is evaporated to dryness in vacuo and the residue is dissolved in 600 parts of benzene. 40 parts of butyl isocyanate are then added dropwise while stirring and the whole is boiled for 1 hour. The solvent is then completely distilled off. 1-benzyl-2-butylcarbamylimino-hexahydropyrimidine remains as an oil.

If, instead of butyl isocyanate, an equivalent amount of dodecyl isocyanate is used, then a compound having similar properties is obtained.

Example 25

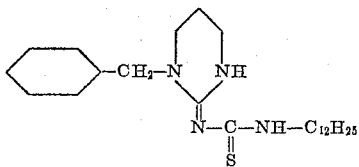

38 parts of 1-benzyl-2-imino-hexahydropyrimidine are dissolved in 300 parts of anhydrous benzene at 60° and 45 parts of dodecyl mustard oil are added dropwise whereupon the whole is boiled for 1 hour. The solution is concentrated in vacuo to the half of its volume and diluted with the same volume of petroleum ether whereby the product crystallises out in the form of colourless crystals. On recrystallising from petroleum ether, 1-benzyl-2-dodecylthiocarbamylimino-hexahydropyrimidine is obtained in the form of beautiful crystals which melt at 82–83°.

A compound having similar properties is obtained if, instead of 1-benzyl-2-imino-hexahydropyrimidine, 1-benzyl-2-imino-imidazolidine is reacted in the manner described above.

Example 26

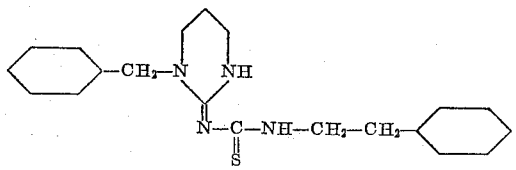

9.2 parts of sodium are dissolved in 150 parts of ethanol and the solution is mixed with a solution of 90 parts of 1-benzyl-2-imino-hexahydropyrimidine hydrochloride in 150 parts of methanol. Sodium chloride immediately precipitates and is removed by filtration. The filtrate is evaporated to dryness in vacuo. The residue is taken up in 600 parts by volume of anhydrous benzene and reacted, while stirring, with 65 parts of phenylethyl mustard oil. The whole is then refluxed for 1 hour. The solution is then concentrated to half of its volume and petroleum ether is added until crystallisation begins. The product soon separates out in the form of beautiful crystals. They are filtered off under suction and recrystallised from cyclohexane. In this way, 1-benzyl-2-phenylethyl-thiocarbamyl-imino-hexahydropyrimidine is obtained which melts at 90–91°.

If, instead of 1-benzyl-2-imino-hexahydropyrimidine hydrochloride, 1-benzyl-2-imino-imidazolidine hydrochloride is used, then a compound having similar properties is obtained.

Example 27

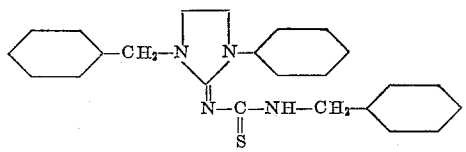

50 parts of 1-benzyl-3-phenyl-2-imino-imidazolidine are dissolved in anhydrous benzene and 30 parts of benzyl mustard oil are added dropwise while stirring at 60°, after which the whole is boiled for 1 hour. After evaporating off the solvent, 1-benzyl-3-phenyl-2-benzylthiocarbamylimino-imidazolidine remains in solid form.

Instead of 1-benzyl-3-phenyl-2-imino-imidazolidine also 1-benzyl-3-butyl-2-imino-imidazolidine can be reacted in the manner described above.

Example 28

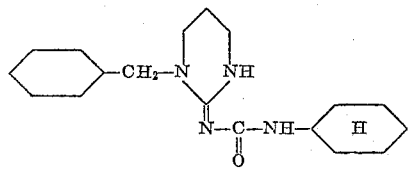

4.6 parts of sodium are dissolved in 100 parts of ethanol and the solution is mixed with a solution of 45 parts of 1-benzyl-2-imino-hexahydropyrimidine hydrochloride in 75 parts of methanol. Sodium chloride immediately precipitates and is filtered off. The filtrate is evaporated to dryness in vacuo and the residue is dissolved in 300 parts of benzene at 60°. 25 parts of cyclohexyl isocyanate are added dropwise while stirring and then the whole is boiled for 1 hour after which the benzene is completely evaporated off in vacuo. An oil remains which crystallises on standing for a long time. In this way, 1-benzyl-2-cyclohexylcarbamylimino-hexahydropyrimidine which melts at 96° is obtained.

A similar compound is obtained if, instead of 1-benzyl-2-imino-hexahydropyrimidine hydrochloride, 1-phenyl-2-imino-imidazolidine hydrochloride is reacted in the manner described above.

Example 29

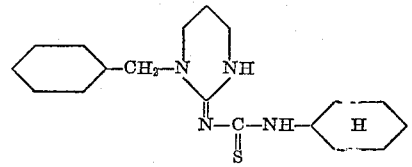

4.6 parts of sodium are dissolved in 100 parts of ethanol and a solution of 45 parts of 1-benzyl-2-imino-hexahydropyrimidine hydrochloride in 75 parts of methanol is added thereto. Sodium chloride precipitates and is removed by filtration. The filtrate is evaporated to dryness in vacuo and the residue is dissolved in 300 parts of benzene at 60°. 28 parts of cyclohexyl mustard oil are added dropwise while stirring at 60° and the whole is boiled for 1 hour. On cooling, a precipitate forms which is filtered off under suction and recrystallised from benzene. In this way, 1-benzyl-2-cyclohexylthiocarbamyl-imino-hexahydropyrimidine which melts at 168–170° is obtained.

Example 30

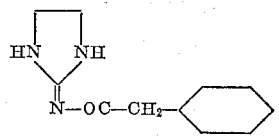

9.2 parts of sodium are dissolved in 200 parts of ethanol and the solution is mixed with a solution of 49 parts of 2-imino-imidazolidine hydrochloride in 100 parts of methanol. Sodium chloride precipitates out and is filtered off. 72 parts of phenylacetic acid ethyl ester are added to the filtrate and the alcohol is completely distilled off through a sloping condenser. The residue is heated to about 130–140°. When no more alcohol distills over, the whole apparatus is evacuated for a short time in order to remove any alcohol remaining. The reaction mass becomes solid. On recrystallising from alcohol, 2-phenylacetylimido-imidazolidine which melts at 200–202° is obtained.

Also acetic ester, butyric acid ester, hexahydrobenzoic acid ester or lauric acid ester can be reacted in the manner described above instead of phenylacetic acid ester to obtain similar compounds.

*Example 31*

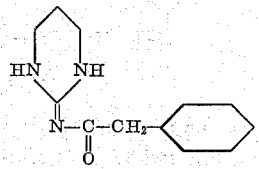

40 parts of 2-imino-hexahydropyrimidine are dissolved in 150 parts of ethanol and the solution of 66 parts of phenylacetic acid ethyl ester is added. The alcohol is completely distilled off through a sloping condenser and the residue is then heated to 100–110°. When no more alcohol distills over, the apparatus is evapuated for 10 minutes in order to remove the last traces of alcohol. On cooling, the reaction mass solidifies. By recrystallising from methanol, 2-phenylacetylimido-hexahydropyrimidine which melts at 160–162° is obtained.

Substances having similar properties are obtained if, instead of phenylacetic acid ester, acetic ester, butyric acid ester, hexahydrobenzoic acid ester or lauric acid ester are used.

*Example 32*

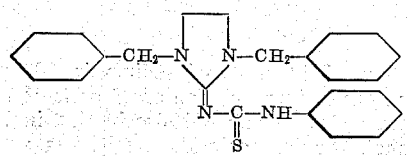

A solution of 301 parts of 1,3-dibenzyl-2-imino-imidazolidine hydrochloride in 750 parts of methanol is added to the solution of 23 parts of sodium in 500 parts of ethanol. Sodium chloride precipitates immediately and is removed by filtration. The filtrate is completely distilled in vacuo and the residue is dissolved in 1000 parts of anhydrous benzene at 60°. 135 parts of phenyl mustard oil are added dropwise while stirring whereupon a slightly exothermic reaction takes place. The whole is then boiled for 1 hour whereupon a precipitate forms which, after cooling, is filtered off under suction, and recrystallised from benzene. In this way, 1,3-dibenzyl-2-phenylthiocarbamylimino-imidazolidine which melts at 192° is obtained.

*Example 33*

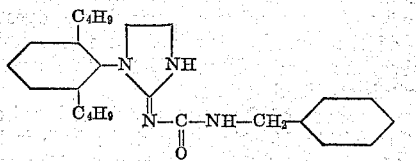

4.6 parts of sodium are dissolved in 100 parts of ethanol and a solution of 62 parts of 1-(2′,6′-di-tert.butylphenyl)-2-imino-imidazolidine hydrochloride in ethanol is added thereto. Sodium chloride precipitates immediately and is filtered off. The residue is evaporated to dryness in vacuo. The residue is dissolved in anhydrous benzene. 27 parts of benzyl isocyanate are then added dropwise while stirring at 60° after which the whole is refluxed for 1 hour. The solvent is then distilled off whereupon 1-phenyl-o,o′-di-tert.butyl-2 - benzylcarbamylimino - imidazolidine remains.

If in the above example, a corresponding number of parts of 1-(p-methoxy- or p-chloro-phenyl)-2-imino-imidazolidine hydrochloride or of 1-naphthyl-(1′)-2-imino-imidazolidine hydrochloride are used, then compounds having similar properties are obtained.

Compounds with similar properties are also obtained when a corresponding number of parts of 1-(p-methyl- or m-ethylphenyl)-2-imino-imidazolidine hydrochloride or of 1-[8′-methyl- or 6′-chloro- or 4′-alkoxy-naphthyl-(1′)]-2-imino-imidazolidine hydrochloride are used.

*Example 34*

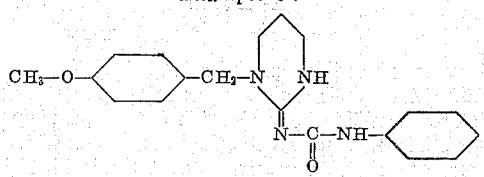

4.6 parts of sodium are dissolved in 100 parts of ethanol and the solution is mixed with a solution of 51 parts of 1-p-methoxybenzyl-2-imino-hexahydropyrimidine hydrochloride in 150 parts of methanol whereupon sodium chloride precipitates. This is filtered off and the filtrate is evaporated to dryness in vacuo. The residue is taken up in anhydrous benzene and reacted, while stirring, with 24 parts of phenyl isocyanate. The whole is then boiled for 1 hour. After distilling off the solvent, 1-p-methoxybenzyl-2 - phenylcarbamylimino - hexahydropyrimidine is obtained.

*Example 35*

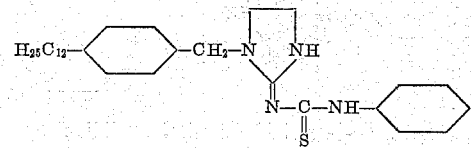

4.6 parts of sodium are dissolved in 100 parts of ethanol and the solution is mixed with a solution of 76 parts of 1-dodecylbenzyl-2-imino-imidazolidine hydrochloride in ethanol. Sodium chloride precipitates and is removed by filtration. The filtrate is evaporated to dryness in vacuo and the residue is dissolved in anhydrous benzene. Then 27 parts of phenyl mustard oil are added while stirring at 60° after which the whole is boiled for 1 hour. On concentrating the solution, 1-dodecylbenzyl-2-phenylthiocarbamylimino-imidazolidine is obtained.

*Example 36*

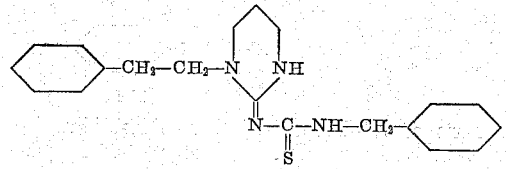

41 parts of 1-phenylethyl-2-imino-hexahydropyrimidine are dissolved in 300 parts of anhydrous benzene and 30 parts of benzyl mustard oil are added while stirring at 60°. The whole is boiled for 1 hour and the solvent is then distilled off. In this way, 1-phenylethyl-2-benzylthiocarbamylimino-hexahydropyrimidine is obtained.

If, instead of 1-phenylethyl-2-imino-hexahydropyrimidine, 1-phenylethyl-2-imino-imidazolidine is used, then a compound having similar properties is obtained.

*Example 37*

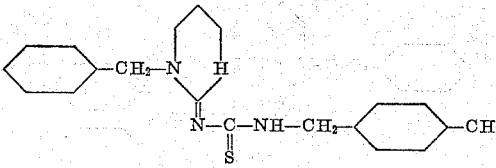

38 parts of 1-benzyl-2-imino-hexahydropyrimidine are dissolved in 300 parts of anhydrous benzene at 60° and then 33 parts of p-methylbenzyl mustard oil are added dropwise while stirring, after which the whole is refluxed for 1 hour. On concentrating the solution, 1-benzyl - 2-p-methylbenzylthiocarbamylimino-hexahydropyrimidine is obtained.

*Example 38*

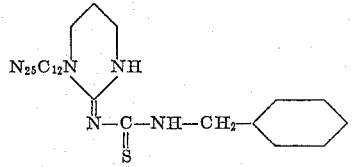

4.6 parts of sodium are dissolved in 100 parts of ethanol. At the same time 60 parts of 1-dodecyl-2-imino-hexahydropyrimidine hydrochloride are dissolved in 150 parts of ethanol. The two solutions are combined whereupon sodium chloride precipitates. This is filtered off and the filtrate is evaporated to dryness in vacuo. The residue is taken up in anhydrous benzene and 30 parts of benzyl mustard oil are added dropwise while stirring at 60°, whereupon the whole is boiled for 1 hour. On cooling, the product crystallises out in the form of colourless crystals. It is filtered off under suction and recrystallised from cyclohexane. In this way, 1-dodecyl-2-benzylthiocarbamylimino-hexahydropyrimidine which melts at 86–87° is obtained.

*Example 39*

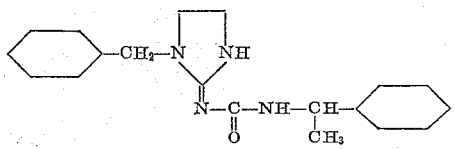

35 parts of 1-benzyl-2-imino-imidazolidine are dissolved in 200 parts of anhydrous benzene. 30 parts of phenylethyl-α-isocyanate are added dropwise while stirring at room temperature. An exothermic reaction takes place. The whole is then boiled for 1 hour. On concentrating the solution, 1-benzyl-2-phenylethyl-α-carbamylimino-imidazolidine is obtained.

*Example 40*

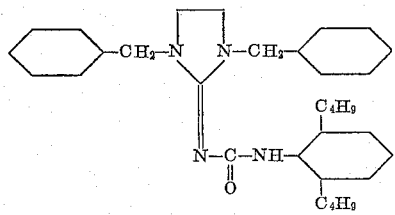

90 parts of 1,3-dibenzyl-2-imino-imidazolidine hydrochloride are dissolved in 350 parts of methanol and a solution of 16.2 parts of sodium methylate in 100 parts of methanol is added while stirring. Sodium chloride precipitates and is removed by filtration. The solvent is then distilled off in vacuo. The residue is dissolved in 350 parts of anhydrous benzene and 69 parts of 2,6-di-tert. butylphenyl-isocyanate are added while stirring whereupon the whole is boiled for 1 hour. On concentrating the solution, 1,3-dibenzyl-2-o,o'-di-tert. butylphenylcarbamylimino-imidazolidine is obtained.

*Example 41*

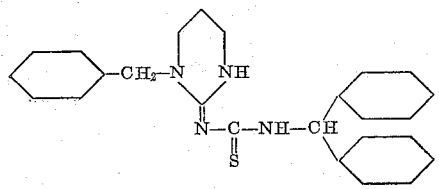

A solution of 4.6 parts of sodium in 100 parts of ethanol is mixed with a solution of 45 parts of 1-benzyl-2-imino-hexahydropyrimidine hydrochloride in 75 parts of methanol whereupon sodium chloride precipitates. This salt is removed by filtration and the filtrate is evaporated to dryness in vacuo. 45 parts of diphenylmethyl mustard oil are then added while stirring and the whole is refluxed for 1 hour. On cooling, the 1-benzyl-2 - diphenylmethylthiocarbamylimino - hexahydropyrimidine crystallises out in colourless crystals which melt at 160–161°.

*Example 42*

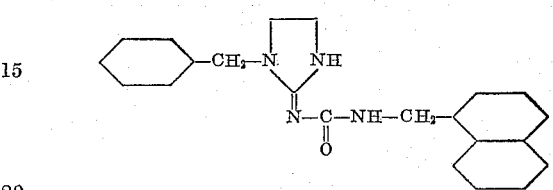

35 parts of 1-benzyl-2-imino-imidazolidine are dissolved in 200 parts of benzene and 37 parts of α-naphthylmethyl isocyanate are added dropwise while stirring at room temperature. An exothermic reaction takes place. The whole is then boiled for 1 hour. On concentrating the solution, 1-benzyl-2-α-naphthylmethylcarbamylimino-imidazolidine is obtained.

A compound corresponding to the above formula in which the benzyl group is replaced by the naphthyl group is obtained when in this example 42 parts of 1-naphthyl-(1')-2-imino-imidazolidine are used.

*Example 43*

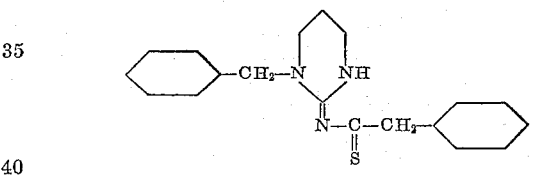

A solution of 4.6 parts of sodium in 100 parts of ethanol is mixed with a solution of 45 parts of 1-benzyl-2-imino-hexahydropyrimidine hydrochloride in 75 parts of methanol. Sodium chloride precipitates and is removed by filtration. 36 parts of phenylthioacetic acid ethyl ester are added to the filtrate and the alcohol is completely distilled off through a sloping condenser. The residue is heated to 130°, then the whole apparatus is evacuated in order to remove traces of alcohol remaining. In this way, 1-benzyl-2-phenylthioacetylimido-hexahydropyrimidine is obtained.

*Example 44*

A fabric made from cellulose acetate is pre-treated for 30 minutes at 40° with an aqueous/ethanolic dispersion which contains 0.7% (calculated on the weight of the fabric) of 1-benzyl-2-phenylcarbamylimino-imidazolidine according to Example 1 and an ethylene oxide condensation product. An aqueous dispersion of 0.1% of a hydroxydialkylamino anthraquinone dyestuff, 0.05% of an alkoxyamino anthraquinone dyestuff and 0.125% of the coupling product from a 1-acylamino-4-aminobenzene and 4-hydroxy-1-methylbenzene are added to this application bath.

The temperature of the treatment bath is raised from 40° to 80° within 30 minutes and the bath is kept for another 45 minutes at this temperature. The sample is then rinsed and dried.

As a comparison, a piece of cellulose acetate fabric is dyed in the same manner as described above but without the 1-benzyl-2-phenylcarbamylimino-imidazolidine.

The samples so treated, together with a test fabric (Gas fading control sample No. 1 of Testfabrics Inc., 55 Vandam Street, New York 13, N.Y.) are then placed in a chamber which excludes light and exposed to the fumes of a gas burner at 40–45° until the test fabric has changed from blue to rose pink, according to the American Standard Test Method L 14-54-1951.

After exposure, the fabric treated with 1-benzyl-2-phenylcarbamylimino-imidazolidine shows practically no change in shade whilst the fabric not treated with 1-benzyl-2-phenylcarbamylimino-imidazolidine is greatly changed in colour.

*Example 45*

A solution of 15 parts of cellulose acetate, 0.15 part of 1-benzyl-2-benzylcarbamylimino-hexahydropyrimidine according to Example 3 and 0.03 part of 1-phenylamino-4-aminoanthraquinone in 100 parts by volume of acetone is worked up into sheets of about 0.2 mm. thickness.

As a comparison, corresponding sheets are produced without 1-benzyl-2-benzylcarbamylimino-hexahydropyrimidine. Samples of these sheets and also of an untreated test sheet (Gas fading control sample No. 1) are subjected to the fumes of a gas burner under the same conditions as given in Example 44.

After exposure, the sheet containing 1-benzyl-2-benzylcarbamylimino-hexahydropyrimidine shows no change in shade whilst the sample without this substance has a vivid change from blue to rose pink.

*Example 46*

Yarn for Spandex fibres (Lycra, Du Pont de Nemours, Wilmington, Delaware USA) is impregnated in a 1% solution of 1-benzyl-2-benzylthiocarbamylimino-hexahydropyrimidine according to example 3 in carbon tetrachloride at 20°, squeezed out to 100% of its weight and dried at 50–60°.

If this yarn is tested for gas fading according to the German Standard Method as described in leaflet DIN 54025 (testing with dilute nitrous gases), then the yellowing is considerably less than it would have been with Spandex yarn not treated with an inhibitor.

*Example 47*

A solution of segmented polyurethane containing approximately 20% solids in N,N-dimethylformamide was prepared according to the procedure of example 1 of French Patent No. 1,225,758. To this solution is added a slurry of titanium dioxide and poly-(N,N-diethyl-β-aminoethylmethacrylate) and ultramarine blue pigment such that the final mixture contains 5% of titanium dioxide, 5% of the polyamine and 60 p.p.m. of the ultramarine blue pigment based on the polymeric solids.

To a portion of the foregoing mixture there was added 1-benzyl-2-benzylthiocarbamylimino-hexahydropyrimidine according to Example 4 such that the mixture contained 1% of this additive based on the polymeric solids. Filaments were dry spun from these solutions in the conventional manner and were measured for "$b$" value, according to the procedure below. This yarn and a control were then subjected to atmospheric exposure for a period of five weeks. After this exposure, they were again measured for "$b$" value. Results were as follows:

|  | "$b$" values | |
|---|---|---|
|  | As prepared | After 5 weeks' atmospheric exposure |
| Sample with 1-benzyl-2-benzylthiocarbamyl-imino-hexahydropyrimidine | −0.1 | 3.8 |
| Control | 2.5 | 10.0 |

The degree of yellowness, referred to in the example as "$b$" value, is determined from colorimetric data obtained by analysing continuous filament samples. The reflectance ratios of the samples in the green and blue filter settings of a colorimeter are measured. Three readings are taken on each of the samples, one of the measurements being made with the sample rotated 90° from the position of the first reading. The "$b$" values are then calculated from the average of three readings, using the following formula:

$$L = 42.34 G^{1/3} B^{1/3}$$

where G represents the reflectance ratio with the green filter and B represents the reflectance ratio with the blue filter.

*Example 48*

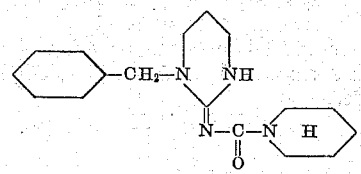

9.2 parts of sodium are dissolved in 200 parts of ethanol, and 90 parts of the solution of 1-benzyl-2-imino-hexahydropyrimidine hydrochloride in 150 parts of methanol are added. Sodium chloride immediately precipitates and is removed by filtration. The filtrate is completely evaporated to dryness in vacuo at 50°. The residue is then dissolved at 60° in 600 parts of benzene and 30 parts of N-piperidyl carboxylic acid chloride are added dropwise while stirring. An exothermic reaction takes place and a greasy precipitate is formed. The reaction mixture is then refluxed for 1 hour and afterwards filtered hot. The solvent is completely removed from the filtrate in vacuo and an oil remains which slowly solidifies. On recrystallising from petroleum ether, 1-benzyl-2-(N-piperidyl-carbonylimino)-hexahydropyrimidine is obtained which melts at 88°.

A similar product is obtained if in the above example, N-pyrrolidyl carboxylic acid chloride is used instead of N-piperidyl carboxylic acid chloride.

*Example 49*

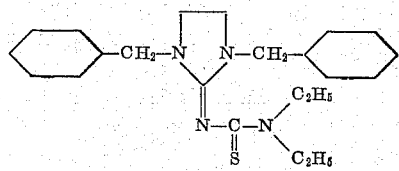

9.2 parts of sodium are dissolved in 200 parts of ethanol and the solution of 120 parts of 1,3-dibenzyl-2-imino-imidazolidine hydrochloride in 300 parts of methanol is added. Sodium chloride precipitates and is removed by filtration. The filtrate is evaporated to dryness in vacuo at 50°. The residue is dissolved in 400 parts of benzene and 30 parts of N,N-diethylthiocarbamic acid chloride are added dropwise while stirring to the solution obtained. The whole is then refluxed for 1 hour after which the precipitate formed is filtered off and the filtrate is evaporated to dryness in vacuo. The residue is then boiled out with n-hexane and filtered hot. On cooling the filtrate, beautiful crystals of 1,3-dibenzyl-(2-N,N-diethylthiocarbamylimino)-imidazolidine are formed. M.P. 97°.

Similar products are obtained if in the aboxe example, N,N-dibutyl- or N,N-dioctyl- or N,N-didodecyl- or N,N-dimethylthiocarbamic acid chloride is used instead of N,N-diethylthiocarbamic acid chloride.

*Example 50*

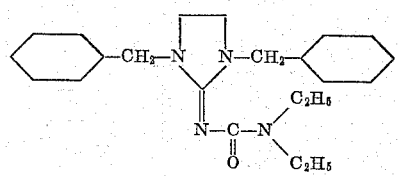

9.2 parts of sodium are dissolved in 200 parts of ethanol and the solution is mixed with that of 120 parts of 1,3-dibenzyl-2-imino-imidazolidine hydrochloride in 300 parts of methanol. Sodium chloride precipitates and is removed by filtration. The filtrate is evaporated to dryness in vacuo and the residue is dissolved in 400 parts of benzene. 27 parts of N,N-diethyl carbamic acid chloride are added dropwise while stirring to the solution obtained and the mixture is then boiled for 1 hour. The solution is then evaporated to dryness in vacuo, the residue is dissolved in boiling n-hexane, this solution is purified by filtration and the filtrate is cooled whereupon beautiful crystals are formed. On recrystallising from petroleum ether, 1,3-dibenzyl-(2-N,N-diethylcarbamylimino)-imidazolidine which melts at 88° is obtained.

A similar product is obtained on using N,N-dimethyl carbamic acid chloride instead of N,N-diethyl carbamic acid chloride.

Example 51

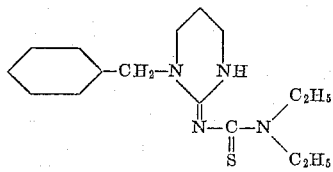

9.2 parts of sodium are dissolved in 200 parts of ethanol and 90 parts of 1-benzyl-2-imino-hexahydropyrimidine hydrochloride in 150 parts of methanol are added to this solution. Sodium chloride separates out and is filtered off. The filtrate is evaporated to dryness and the residue is dissolved in 600 parts of benzene. 30 parts of N,N-diethyl thiocarbamic acid chloride are added dropwise to this solution while stirring and the whole is boiled for 1 hour. A sticky precipitate is formed. This is isolated by decantation and the solvent is removed by evaporation. An oil remains which slowly solidifies. On recrystallising from n-hexane, 1-benzyl-(2-N,N-diethyl-thiocarbamylimino)-hexahydropyrimidine which melts at 97° is obtained.

Similar products are obtained if in the above example, 1-dodecyl- or 1-cyclohexyl- 2-imino-hexahydropyrimidine hydrochloride is used instead of 1-benzyl-2-imino-hexahydropyrimidine hydrochloride.

Example 52

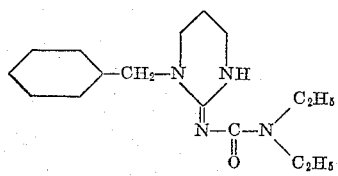

9.2 parts of sodium are dissolved in 200 parts of alcohol. A solution of 90 parts of 1-benzyl-2-imino-hexahydropyrimidine hydrochloride in 150 parts of methanol is added and the sodium chloride which precipitates is filtered off. The filtrate is evaporated to dryness in vacuo. The residue is taken up in 600 parts of benzene, 27 parts of N,N-diethyl carbamic acid chloride are added dropwise to this solution while stirring and the whole is boiled for 1 hour. The precipitate which forms is filtered off, and the solvent is removed from the filtrate. The residue so obtained is recrystallised from n-hexane. In this way, 1-benzyl-(2-N,N-diethylcarbamylimino)-hexahydropyrimidine which melts at 75° is obtained.

Example 53

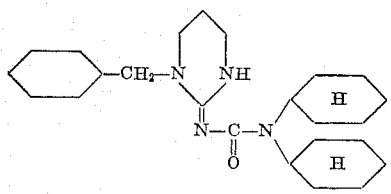

75.2 parts of 1-benzyl-2-imino-hexahydropyrimidine are dissolved in 600 parts of benzene and 48.7 parts of N,N-dicyclohexyl carbamic acid chloride are added dropwise while stirring at 60°. An exothermic reaction takes place and a precipitate is formed. The whole is then boiled for 1 hour, the precipitate is filtered off and the solvent is removed from the filtrate by distillation. The residue consists of 1-benzyl-(2-N,N-dicyclohexylcarbamylimino)-hexahydropyrimidine.

Similar products are obtained if in the above example, the N,N-dicyclohexyl carbamic acid chloride is replaced by N-phenyl-N-methyl carbamic acid chloride or by N,N-dibenzyl carbamic acid chloride.

Example 54

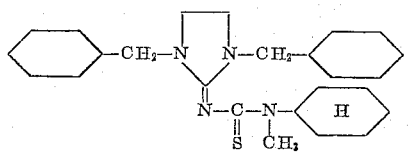

106 parts of 1,3-dibenzyl-2-imino-imidazolidine are dissolved in 400 parts of benzene, 38.3 parts of N-cyclohexyl-N-methyl thiocarbamid acid chloride are added dropwise while stirring and the whole is refluxed for 1 hour. The precipitate formed is filtered off and the solvent is removed from the filtrate. The residue consists of 1,3 - dibenzyl-(2-N-cyclohexyl-N-methyl-thiocarbamylimino)-imidazolidine.

Similar products are obtained if in the above example, the N-cyclohexyl-N-methyl-thiocarbamic acid chloride is replaced by an equivalent number of parts of N-p-methylcyclohexyl-, N-p-ethylcyclohexyl-, N-p-butylcyclohexyl- or N-p-methoxycyclohexyl-N-methyl-thiocarbamic acid chloride.

What is claimed is:
1. A compound of the formula

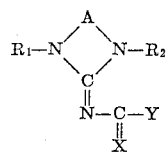

wherein A is a member selected from the group consisting of

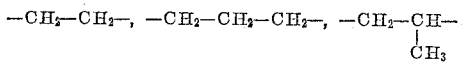

and

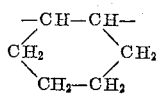

X is a member selected from the group consisting of O and S,

Y is a member selected from the group consisting of

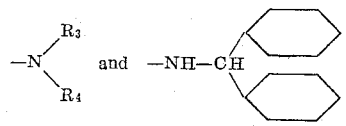

and each of
$R_1$, $R_2$, $R_3$ and $R_4$ taken independently of each other is a member selected from the group consisting of hydrogen,
alkyl with maximally 12 carbon atoms,
cyclohexyl, lower alkyl-cyclohexyl, lower alkoxy-cyclohexyl, and Aryl-(—Z—)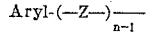

wherein Z is an alkylene radical with from 1 to 2 carbon atoms, $n$ is an integer ranging from 1 to 2, and Aryl is a member selected from the group consisting of unsubstituted, chlorine-substituted, alkyl-substituted and alkoxy-substituted phenyl and naphthyl, the last mentioned alkyl and alkoxy having maximally 12 carbon atoms, $R_3$ and $R_4$ taken together is $$-(CH_2)_m-$$

wherein m is an integer ranging from 4 to 5.

2. The heterocyclic compound of the formula

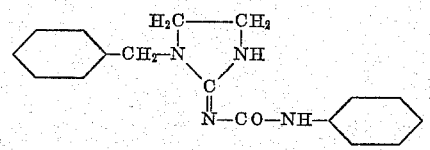

3. The heterocyclic compound of the formula

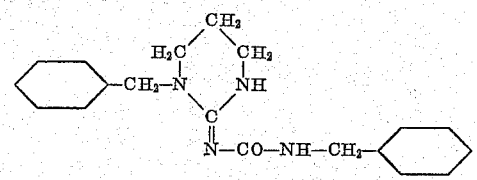

4. The heterocyclic compound of the formula

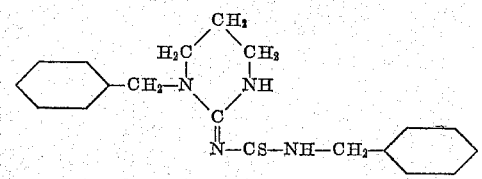

5. The heterocyclic compound of the formula

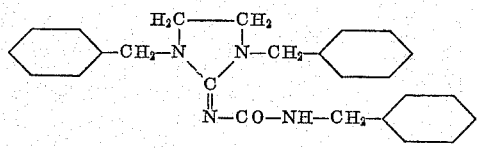

6. The heterocyclic compound of the formula

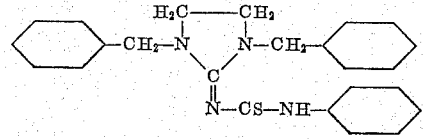

7. The heterocyclic compound of the formula

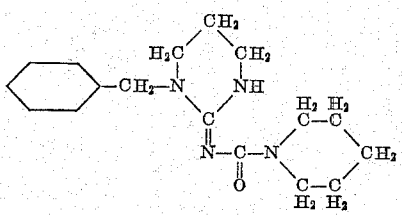

8. The heterocyclic compound of the formula

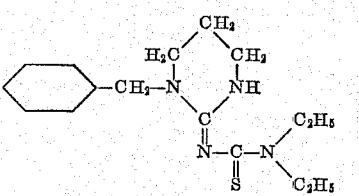

9. The heterocyclic compound of the formula

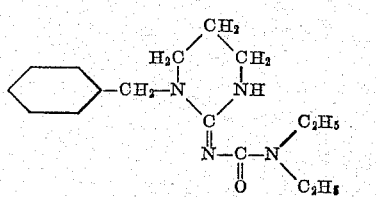

References Cited in the file of this patent
UNITED STATES PATENTS 2,953,444    Thompson _____ Sept. 20, 1960
3,027,370    Bindler _____ Mar. 27, 1962

OTHER REFERENCES

Smith et al.: J. Org. Chem., vol. 20, pages 829–38 (1955) QD241J6.